US010826424B2

(12) United States Patent
Welchko et al.

(10) Patent No.: US 10,826,424 B2
(45) Date of Patent: Nov. 3, 2020

(54) METHOD AND APPARATUS FOR CONTROLLING A CASCADED INVERTER CIRCUIT AND AN ELECTRIC MACHINE

(71) Applicant: GM Global Technology Operations LLC, Detroit, MI (US)

(72) Inventors: Brian A. Welchko, Oakland, MI (US); Brent S. Gagas, Ferndale, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 16/031,632

(22) Filed: Jul. 10, 2018

(65) Prior Publication Data

US 2020/0021226 A1 Jan. 16, 2020

(51) Int. Cl.
| | |
|---|---|
| H02P 27/08 | (2006.01) |
| H02M 7/5395 | (2006.01) |
| H02P 29/50 | (2016.01) |
| H02M 1/38 | (2007.01) |
| H02M 7/5387 | (2007.01) |

(52) U.S. Cl.
CPC ........ H02P 27/085 (2013.01); H02M 7/5395 (2013.01); H02M 7/5387 (2013.01); H02M 2001/385 (2013.01); H02P 29/50 (2016.02)

(58) Field of Classification Search
CPC .... H02P 27/085; H02P 29/50; H02M 7/5395; H02M 2001/385; H02M 7/5387
USPC .............................................. 318/400.26, 801
See application file for complete search history.

(56) References Cited

U.S. PATENT DOCUMENTS

| | | | |
|---|---|---|---|
| 2005/0231152 A1* | 10/2005 | Welchko | ............... B60L 15/007 318/801 |
| 2016/0141982 A1 | 5/2016 | Yim et al. | |
| 2017/0294864 A1* | 10/2017 | Tada | ....................... H02P 29/50 |

OTHER PUBLICATIONS

Leggate, Kerkman; "Pulse-Based Dead-Time Compensator for PWM Voltage Inverters"; IEEE; pp. 191-197, vol. 44, No. 2, Apr. 1997.

* cited by examiner

Primary Examiner — Eduardo Colon Santana
Assistant Examiner — Zemenay T Truneh
(74) Attorney, Agent, or Firm — Quinn IP Law

(57) ABSTRACT

A cascaded inverter system is described and includes an electric machine that is electrically connected in series between first and second inverters. A controller is in communication with the first and second inverters, and includes an executable instruction set. A first dead-time compensation term and a first voltage compensation term are determined based upon an initial phase current and a switching frequency for the first inverter, and a final first duty cycle is determined based thereon. Simultaneously, a second dead-time compensation term and a second voltage compensation term are determined based upon the inverted initial phase current and a switching frequency for the second inverter, and a final second duty cycle is determined based thereon. Operation of the first and second inverters are dynamically controlled based upon the final first duty cycle and the final second duty cycle, respectively.

15 Claims, 4 Drawing Sheets

METHOD AND APPARATUS FOR CONTROLLING A CASCADED INVERTER CIRCUIT AND AN ELECTRIC MACHINE

INTRODUCTION

Control of AC motor/generators, such as multi-phase permanent magnet synchronous electric motor/generators (electric machines) may be accomplished employing pulsewidth-modulated (PWM) inverters. A PWM inverter includes a plurality of pairs of power switches (switch pairs) that can be controlled in several different operational modes via a gate driver that is controlled by a controller. One arrangement may include a cascaded inverter system, which includes a multi-phase electric machine that is electrically connected in series between a first multi-phase pulsewidth-modulated inverter circuit and a second multi-phase pulsewidth-modulated inverter circuit.

During operation, there may exist a period of time during commutation of the power switches when both switches of a switch pair cease to conduct current, referred to as a dead-time period or a blanking time. During the dead-time period, current is only conducted through reverse recovery diodes that are arranged in an anti-parallel configuration with the power switches. Furthermore, during the dead-time period, there may be a voltage loss across the terminals of the inverter, a voltage gain across the terminals of the inverter, or there may be no effect on the voltage across the terminal of the inverter. The voltage loss and voltage gain may cause instability in operation of the electric machine, with an accompanying introduction of increased current draw to induce stability. The increased current draw may reduce efficiency of the electric machine.

SUMMARY

A cascaded inverter system for operating a multi-phase electric machine is described, and includes a first multi-phase pulsewidth-modulated inverter circuit (first inverter) and a second multi-phase pulsewidth-modulated inverter circuit (second inverter), wherein the multi-phase electric machine is electrically connected in series therebetween. A controller is in communication with the first and second inverters, and includes an instruction set that is executable as follows. An initial phase current, a first initial duty cycle for controlling the first inverter, and a second initial duty cycle for controlling the second inverter are determined. A first dead-time compensation term and a first voltage compensation term are determined based upon the initial phase current and a switching frequency for the first inverter, and a final first duty cycle is determined based upon the first initial duty cycle, the first dead-time compensation term and the first voltage compensation term. Simultaneously, the initial phase current is inverted, and a second dead-time compensation term and a second voltage compensation term are determined based upon the inverted initial phase current and a switching frequency for the second inverter. A final second duty cycle is determined based upon the second initial duty cycle, the second dead-time compensation term and the second voltage compensation term. Operation of the first inverter is dynamically controlled based upon the final first duty cycle simultaneously with operation of the second inverter being controlled based upon the final second duty cycle.

An aspect of the disclosure includes the first and second inverters being configured to operate in a linear modulation mode, wherein the controller is disposed to control operation of the first inverter based upon the final first duty cycle and simultaneously control operation of the second inverter based upon the final second duty cycle when the controller is operating the first and second inverters in the linear modulation mode.

Another aspect of the disclosure includes the controller being in communication with the first inverter via a first gate driver and the controller in communication with the second inverter via a second gate driver.

Another aspect of the disclosure includes the multi-phase electric machine being a synchronous permanent magnet electric machine.

Another aspect of the disclosure includes determining an average voltage drop across the first inverter, determining a dc link voltage, and determining the first voltage compensation based upon a ratio of the voltage drop across the first inverter and the dc link voltage.

Another aspect of the disclosure includes determining an average voltage drop across the second inverter, determining a dc link voltage, and determining the second voltage compensation based upon a ratio of the voltage drop across the second inverter and the dc link voltage.

Another aspect of the disclosure includes determining a switching frequency for the first inverter, determining a cycle period for the first inverter based upon the switching frequency, determining a first dead-time period associated with operation of the first inverter, and determining the first dead-time compensation term based upon a comparison of the first dead-time period and the cycle period.

Another aspect of the disclosure includes determining a switching frequency for the second inverter, determining a cycle period for the second inverter based upon the switching frequency, determining a second dead-time period associated with operation of the second inverter, and determining the second dead-time compensation term based upon a comparison of the second dead-time period and the cycle period.

Another aspect of the disclosure includes a current sensor disposed to monitor electric current between the first inverter and one of the phases of the multi-phase electric machine to determine the initial phase current.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
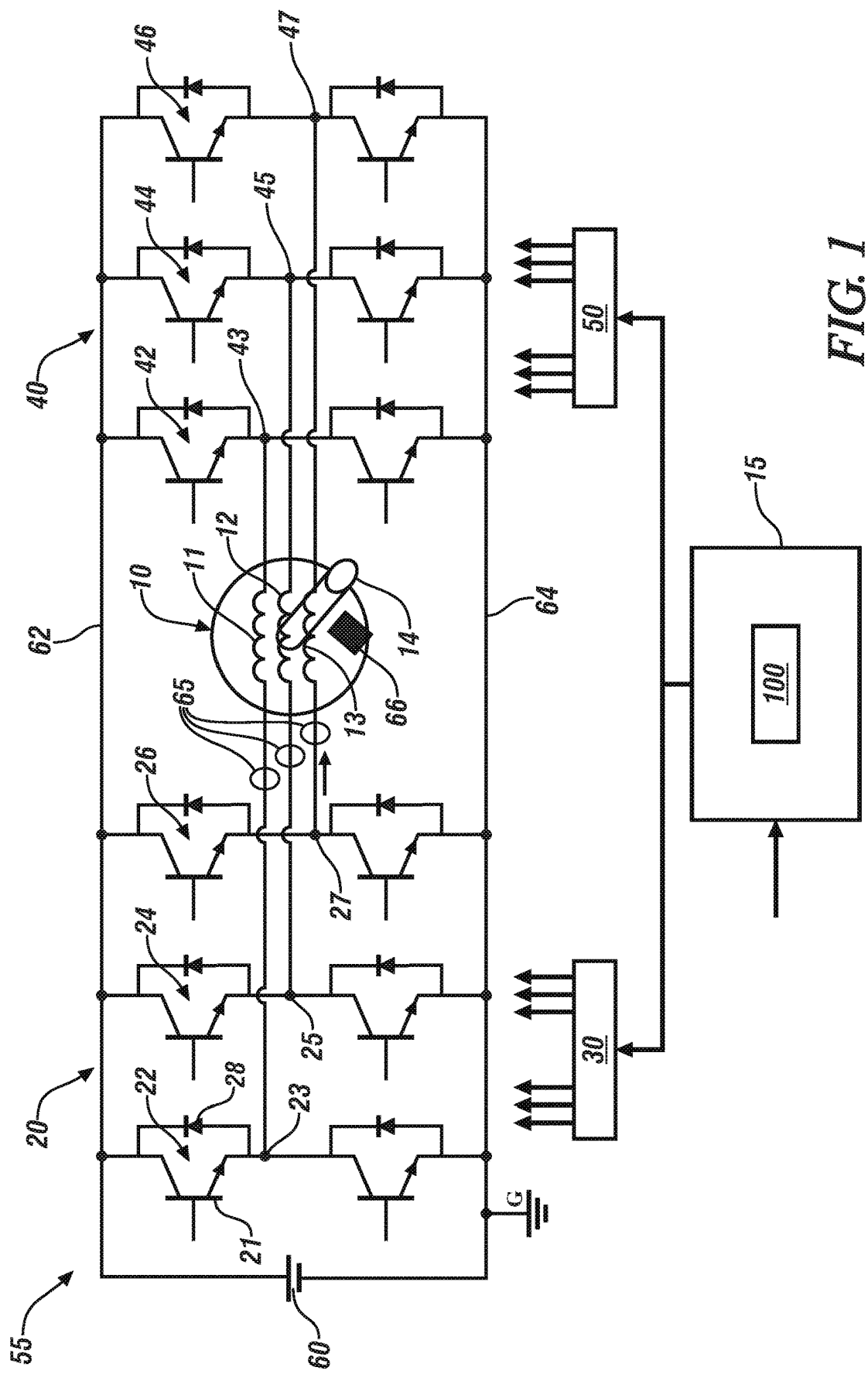
FIG. 1 schematically illustrates a cascaded inverter system, including a multi-phase electric machine electrically connected in series between a first inverter and a second inverter, in accordance with the disclosure.

Referring now to the drawings, which are provided for the purpose of illustrating certain exemplary embodiments and not for the purpose of limiting the same, FIG. 1 schematically illustrates a cascaded inverter system 55 for controlling operation of a multi-phase electric machine 10, including the electric machine 10 being electrically connected in series between a first electric power inverter (first inverter) 20 and a second electric power inverter (second inverter) 40. The cascaded inverter system 55 describes a topology that includes the multi-phase electric machine 10 being electrically connected in series between the first electric power inverter 20 and the second electric power inverter 40. DC electric power can be supplied to the first and second inverters 20, 40 from a high-voltage DC power source 60 via a positive high-voltage bus (HV+) 62 and a negative high-voltage bus (HV−) 64. Operational control of the first and second inverters 20, 40 is provided via corresponding first and second gate drivers 30, 50, respectively, which are in communication with a controller 15. The arrangement as shown is illustrative of one embodiment. Other elements and/or arrangements of elements are contemplated within the scope of this disclosure to accomplish the described operations in the manner set forth herein.

The electric machine 10 includes a rotor 14 and a stator, with electrical power being supplied to the stator via the first and second inverters 20, 40. The electric machine 10 may be an AC induction machine, a switched reluctance machine, a synchronous permanent magnet machine, or another electric machine within the scope of the disclosure. The electric machine 10 is configured to operate as either or both an electric motor to generate torque or an electric generator to react torque in response to electric power that is applied via one or both of the first and second inverters 20, 40. The electrical windings of the stator of the electric machine 10 include a first phase winding 11, a second phase winding 12 and a third phase winding 13, which are arranged in an open winding configuration, meaning that both ends of the windings of the electric machine 10 are accessible by terminal connections, and the phase windings are not connected inside the electric machine 10 in one embodiment. In one embodiment and as shown, the electric machine 10 is configured as a three-phase electric machine, although alternate embodiments may include two-, four-, five-, six-, seven-phase or another quantity of electrical phases. Rotational position and speed of the rotor 14 may be monitored via a rotational position sensor 66, such as, by way of non-limiting embodiments, a resolver or a Hall effect sensor.

The high-voltage DC power source 60 supplies electric power to the first and second inverters 20, 40 via a positive high-voltage bus (HV+) 62 and a negative high-voltage bus (HV−) 64. The high-voltage DC power source 60 is a high-voltage DC electrical energy storage device, e.g., a high-voltage battery, a high-voltage capacitor, or another device or system. The term "high-voltage" represents voltage levels in the order of magnitude of 48V in one embodiment. Alternatively, the term "high-voltage" represents voltage levels in the order of magnitude of 300V in one embodiment.

The first and second inverters 20, 40 include a plurality of power switches 21, wherein pairs of the power switches 21 are arranged in series and joined at a node to form a plurality of switch pairs that electrically connect in series between HV+ 62 and HV− 64. The first gate driver 30 is in communication with each of the power switches 21 of the first inverter 20 to provide operational control thereof, and the second gate driver 50 is in communication with each of the power switches 21 of the second inverter 40 to provide operational control thereof.

The first inverter 20 includes a first switch pair 22 of the power switches 21 that are joined in series at a first node 23, a second switch pair 24 of the power switches 21 that are joined in series at a second node 25, and a third switch pair 26 of the power switches 21 that are joined in series at a third node 27. The first node 23 electrically connects to a first side of the first phase winding 11 of the electric machine 10. The second node 25 electrically connects to a first side of the second phase winding 12 of the electric machine 10. The third node 27 electrically connects to a first side of the third phase winding 13 of the electric machine 10.

The second inverter 40 includes a fourth switch pair 42 of the power switches 21 that are joined in series at a fourth node 43, a fifth switch pair 44 of the power switches 21 that are joined in series at a fifth node 45, and a sixth switch pair 46 of the power switches 21 that are joined in series at a sixth node 47. The fourth node 43 electrically connects to a second side of the first phase winding 11 of the electric machine 10. The fifth node 45 electrically connects to a second side of the second phase winding 12 of the electric machine 10. The sixth node 47 electrically connects to a first side of the third phase winding 13 of the electric machine 10.

Each of the aforementioned power switches 21 can be an Insulated Gate Bipolar Transistor (IGBT) having a reverse recovery diode 28 arranged in parallel in one embodiment. Alternatively, the power switches 21 may be another power switch device, e.g., a MOSFET device, a SiC device, or another power switching device without limitation. The first gate driver 30 selectively activates each of the power switches 21 of the first inverter 20 simultaneous with the second gate driver 50 selectively activating each of the power switches 21 of the second inverter 40 to transfer electric power to the first, second and/or third phase windings 11, 12, 13 of the electric machine 10 to effect current flow thereacross to generate or react electric power.

Each of the switches 21 may be configured as a normally-OFF switch, meaning that the switch 21 conducts electrical current only when activated by the respective first or second gate driver 30, 50. Alternatively, each of the switches 21 may be configured as a normally-ON switch, meaning that the respective power switch 21 conducts electrical current except when activated by the respective first or second gate driver 30, 50. Alternatively, selected ones of the power switches 21 may be configured as a normally-OFF switch or as a normally-ON switch.

During operation in absence of a circuit fault, the first and second gate drivers 30, 50 may generate control signals to selectively activate and selectively deactivate individual ones of the power switches 21 to operate the electric machine 10 to generate or react torque. The first and second inverters 20, 40 electrically operatively connect to the electric machine 10 to effect power transfer between HV+ 62 and HV− 64 and one of the first, second and/or third phase windings 11, 12, 13 of the electric machine 10 in response to control signals originating at controller 15 to induce an electric field in an element of the stator of the electric machine 10. The electric field acts on an element of the rotor 14 of the electric machine 10 to urge movement of the rotor 14 towards or away from the stator, thus inducing torque in a shaft member mechanically coupled to the rotor 14.

The controller 15 monitors signal inputs from sensors, e.g., the rotational position sensor 66 and phase current sensors 65, and controls operation of the first and second gate drivers 30, 50 to control the respective first and second inverters 20, 40 in a PWM mode or another mode, e.g., a block operation mode, in response to a torque or speed command. In the PWM mode, the first and second inverters 20, 40 are controlled to switch rapidly among ON states and OFF states to transfer electric power to the first, second and/or third phase windings 11, 12, 13 of the electric machine 10 to generate or react electric power. The controller 15 specifies what fraction of the time is spent in each of the three states by specifying PWM duty cycles.

The controller 15 generates the PWM duty cycles at regular intervals such that the frequency of updates is significantly higher than the frequency of the rotor 14 rotation. The maximum amplitude of the voltage at each of the nodes 23, 25, 27, 43, 45, 47 is dictated by the magnitude of DC voltage at HV+ 62. The torque is dictated by the DC voltage, the rotor speed, and the phase difference between these quasi-sinusoidal AC voltage signals and the rotor position. The controller 15 issues commands to the first and second inverters 20, 40 to indicate when to switch to a next control state in a sequence to effect rotation of the rotor 14 of the electric machine.

Phase currents in the cascaded inverter system 55 described herein may not sum to zero under some operating conditions, such as during the period of time during commutation of the power switches when both power switches of a switch pair cease to conduct current, which is referred to herein as a dead-time period. The dead-time period occurs during switch transitions, and is a fixed time period during which both of the power switches of the switch pair are turned off. For example, a dead-time period occurs when the lower power switch of a switch pair is turned off while the upper power switch of the switch pair is in the off state prior to the upper power switch being turned on during a switch transition. This fixed width time may be about 3 µs for IGBTs used in automotive applications, with a range between 1-5 µs, depending on the switch technology being employed. The dead-time period is one form of inverter non-linearity that introduces a zero-sequence voltage that induces a circulating current in the cascaded inverter system 55. The circulating current may induce motor and system losses, which can negate operating benefits associated with the cascaded inverter system 55. Circulating current is current that flows in an electrical machine that produces no fundamental component with respect to the synchronous or excitation frequency of the electrical machine. Average torque is only produced by fundamental current, whereas circulating currents produce no average, i.e., no useful torque. However, circulating currents produce losses that reduce operating efficiency. Circulating currents may also be referred to as zero-sequence currents. The controller 15 includes one or more executable control routines that include dead-time compensation to eliminate the zero-sequence voltage caused by the dead-time period and voltage drop. The dead-time period needs to be compensated on the first inverter 20 independently and opposite from the compensation on the second inverter 40. Using a saturating value allows for the dead-time period to be phased out at low current levels where zero crossing knowledge is indeterminate. The dead-time period is also adjusted to account for power switch voltage drop, adding to its performance. The compensation method described herein is executed at the phase level in the stationary reference frame. The voltage drop compensation is added by adjusting the saturating value to include both physical dead-time percentage plus average voltage drop percentage (Vdrop/Vbus) across the power switch.

Figure 2:
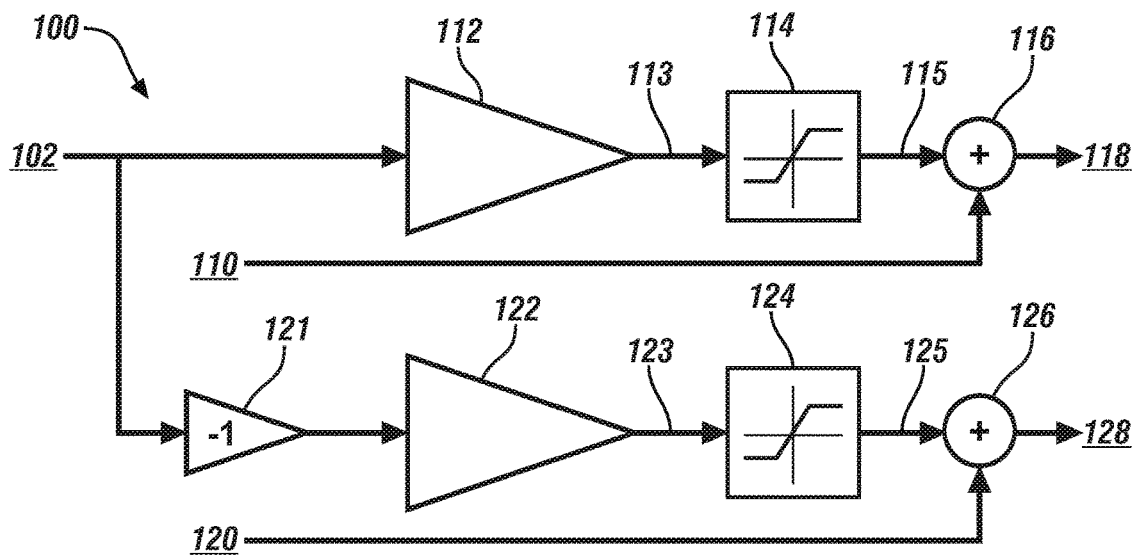
FIG. 2 schematically illustrates a control system that may be executed in the controller to operate the cascaded inverter system, including controlling operation of the first and second inverters to control the electric machine, wherein the control system compensates for inverter non-linearities of dead-time and inverter voltage drop, in accordance with the disclosure.

FIG. 2 schematically shows a control system 100 that may be executed in the controller 15 to operate the cascaded inverter system 55 including the first and second inverters 20, 40 to control an embodiment of the electric machine 10. The control system 100 compensates for inverter non-linearities of dead-time period and inverter voltage drop to reduce circulating currents, which renders the cascaded inverter system 55 practical for a variety of applications, including as part of a propulsion system for an electric vehicle. The first and second inverters 20, 40 are operated independently as two-three phase groups that are in opposition, including adjusting the compensation value to include compensations for dead-time period and voltage drop. The control system 100 is executed as one or more routines in the controller 15.

The control system 100 as shown executes to control the first and second inverters 20, 40 to transfer power to the multi-phase electric machine 10, as follows. The power transferred to the electric machine 10 for positive or negative torque generation is characterized in terms of the voltage level between HV+ 62 and HV− 64, switching frequencies of the first and second inverters 20, 40, and a pulsewidth-modulated (PWM) duty cycle for each of the phases of both the first and second inverters 20, 40. The inputs to the control system 100 include the phase current 102, a first initial PWM duty cycle 110 for controlling the first inverter 20, and a second initial PWM duty cycle 120 for controlling the second inverter 40. The first and second initial PWM duty cycles 110, 120 are determined based upon a commanded torque or power output, taking into account the voltage level between HV+ 62 and HV− 64, and the switching frequencies of the first and second inverters 20, 40. In one embodiment, the switching frequency of the first inverter 20 is the same as the switching frequency of the second inverter 40, and the switching is synchronized. The phase current 102 may be a commanded value or an observed value, e.g., as input from the related current sensor specific to the phase of the electric machine 10, including input from the respective one of the current sensors 65 that is associated with the phase of the electric machine 10 that is being controlled.

A first gain element 112 determines a first dead-time compensation term 113 based upon the initial phase current 102 and the switching frequency for the first inverter 20. The first dead-time compensation term 113 is a duty-cycle compensation term that is based upon the elapsed period of time associated with the dead-time period and the cycle period for the first inverter 20, which is determined based upon the switching frequency for the first inverter 20. Since the dead-time period is fixed in time, the duty cycle compensation is adjusted based on the switching frequency. Thus, in one example, a dead-time period of 3 uS that occurs during operation of the first inverter 20 that has a cycle period of 100 μs will result in a duty cycle compensation of 3 uS/100 uS or 0.03, which yields a dead-time percentage of 3%.

A first voltage compensation element 114 determines a first voltage compensation term 115, which compensates for an average voltage drop across the first inverter 20 as seen by the electric machine 10. An example value for voltage drop is 2V, with a range of 0-4V. This is compared with a dc link voltage, e.g., the voltage level between HV+ 62 and HV− 64. In an embodiment wherein the dc link voltage is 300V, the duty cycle compensation for the voltage drop is 2V/300V=0.00667, which yields a voltage drop percentage of 0.7%. A final first PWM duty cycle 118 is determined based upon the first initial duty cycle 110 as adjusted by the first dead-time compensation term 113 and the first voltage compensation term 115 employing summer element 116. In one embodiment, the first voltage compensation element 114 includes a saturating block that clips the value of the compensation associated with the dead-time percentage and the voltage drop percentage. The first gain element 112 multiplies the value of current such that when clipped by the first voltage compensation element 114, the full compensation will be applied at the desired current level, e.g., at 10-15 A in one embodiment.

In a similar manner, the phase current 102 is subject to being inverted 121 and input to a second gain element 122. The second gain element 122 determines a second dead-time compensation term 123 based upon the initial phase current 102 and the switching frequency for the second inverter 40. The second dead-time compensation term 123 is a duty-cycle compensation term that is based upon the elapsed period of time associated with the dead-time period and the cycle period for the second inverter 40, which is determined based upon the switching frequency for the second inverter 40. Since the dead-time period is fixed in time, the duty cycle compensation is adjusted based on the switching frequency.

A second voltage compensation element 124 determines a second voltage compensation element 125, which compensates for an average voltage drop across the second inverter 40 as seen by the electric machine 10. An example value for voltage drop is 2V, with a range of 0-4V. This is compared with a dc link voltage, e.g., the voltage level between HV+ 62 and HV− 64. A final second PWM duty cycle 128 is determined based upon the second initial duty cycle 125 as adjusted by the second dead-time compensation term 123 and the second voltage compensation term 125 employing summer element 126. In one embodiment, the second voltage compensation element 124 includes a saturating block that clips the value of the compensation associated with the dead-time percentage and the voltage drop percentage. The second gain element 122 multiplies the value of the inverted current such that when clipped by the second voltage compensation element 124, the full compensation will be applied at the desired current level, e.g., at −10 to −15 A in one embodiment.

The final first PWM duty cycle 118 is employed by the controller 15 to control the first inverter 20 to compensate for non-linearities of dead-time period and inverter voltage drop that can occur in the first inverter 20. Likewise the final second PWM duty cycle 128 is employed by the controller 15 to control the second inverter 40 to compensate for non-linearities of dead-time period and inverter voltage drop that can occur in the second inverter 40, while taking into account the inversion of the phase current 102. This compensation is executed at the phase level in the stationary reference frame, and is executed on both the first and second inverters 20, 40 in opposition. Voltage drop compensation is added by adjusting the saturating value to include both physical dead-time percentage plus average voltage drop percentage (Vdrop/Vbus) across the associated power switch. Both the voltage drop and dead-time period need to be monitored by the control system and be adjusted based on real-time operating conditions. The dead-time compensation will change if the switching frequency changes and the inverter voltage drop changes with the amplitude of the phase current and dc link voltage. Since the voltage drop of the power switch is fairly constant, the most important part is to change it with the dc link voltage which may change regularly and rapidly.

Figure 3:
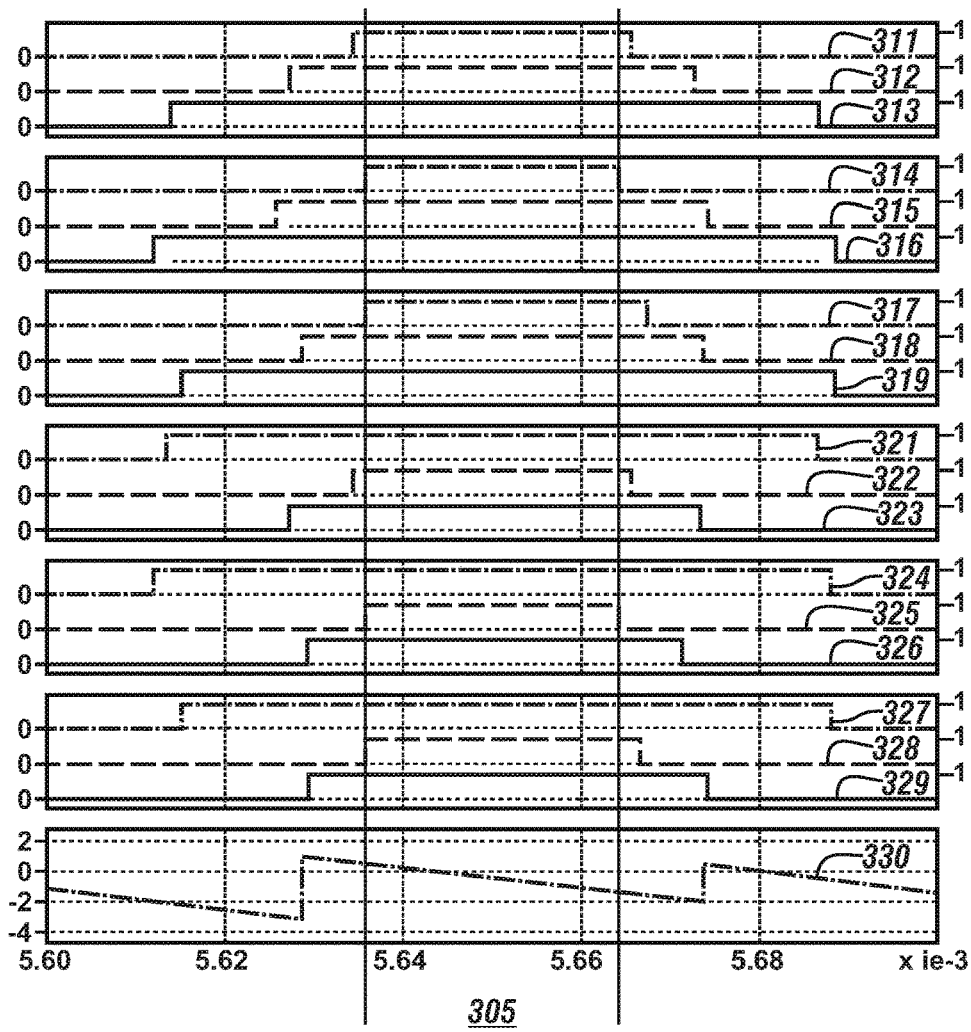
FIG. 3 graphically shows a plurality of switch control signals that are associated with inverter control for an embodiment of the cascaded inverter system described with reference to FIGS. 1 and 2, over a single period of time associated with operation of the cascaded inverter system, in accordance with the disclosure.

FIG. 3 graphically shows a plurality of switch control signals that are associated with inverter control for an embodiment of the cascaded inverter system 55 described with reference to FIGS. 1 and 2, over a single PWM period 305, which is indicated on the horizontal axis. Each of the power switches is a bi-stable device, and each of the control signals has a value of "0", representing an OFF or non-conducting state, or a value of "1", representing an ON or conducting state.

Signals 311, 312 and 313 represent control signals for first, second and third phases, respectively, of the first inverter 20, without signal modification. Each of the signals 311, 312 and 313 is analogous to the first initial PWM duty cycle 110 that is described with reference to FIG. 2.

Signals 314, 315 and 316 represent control signals for first, second and third phases, respectively, of the first inverter 20, with the duty cycles having been adjusted based upon the dead-time compensation and the voltage compensation. Each of the signals 314, 315 and 316 is analogous to the final first PWM duty cycle 118, which has been determined based upon the first initial duty cycle 110 as adjusted by the first dead-time compensation term 113 and the first voltage compensation term 115.

Signals 317, 318 and 319 represent effective or resulting control signals that have been achieved in controlling the first inverter 20 for first, second and third phases, respectively, of the first inverter 20, with the duty cycles having been adjusted based upon the dead-time compensation and the voltage compensation.

Signals 321, 322 and 323 represent control signals for first, second and third phases, respectively, of the second inverter 40, without signal modification. Each of the signals 321, 322 and 323 is analogous to the second initial PWM duty cycle 120 that is described with reference to FIG. 2.

Signals 324, 325 and 326 represent control signals for first, second and third phases, respectively, of the second inverter 40, with the duty cycles having been adjusted based upon the dead-time compensation and the voltage compensation. Each of the signals 324, 325 and 326 is analogous to the final second PWM duty cycle 128, which has been determined based upon the second initial duty cycle 120 as adjusted by the second dead-time compensation term 123 and the second voltage compensation term 125.

Signals 327, 328 and 329 represent effective or resulting control signals that have been achieved in controlling the second inverter 40 for first, second and third phases, respectively, of the second inverter 40, with the duty cycles having been adjusted based upon the dead-time compensation and the voltage compensation.

Signal 330 represents circulating current during operation. The resulting control signals, i.e., signals 317, 318, 319 and 327, 328 and 329 and the associated circulating current 330 indicate that the compensation routine employing the control system 100 to control operation of the cascaded inverter system 55 is functioning as expected to limit the circulating current 330.

Figure 4:
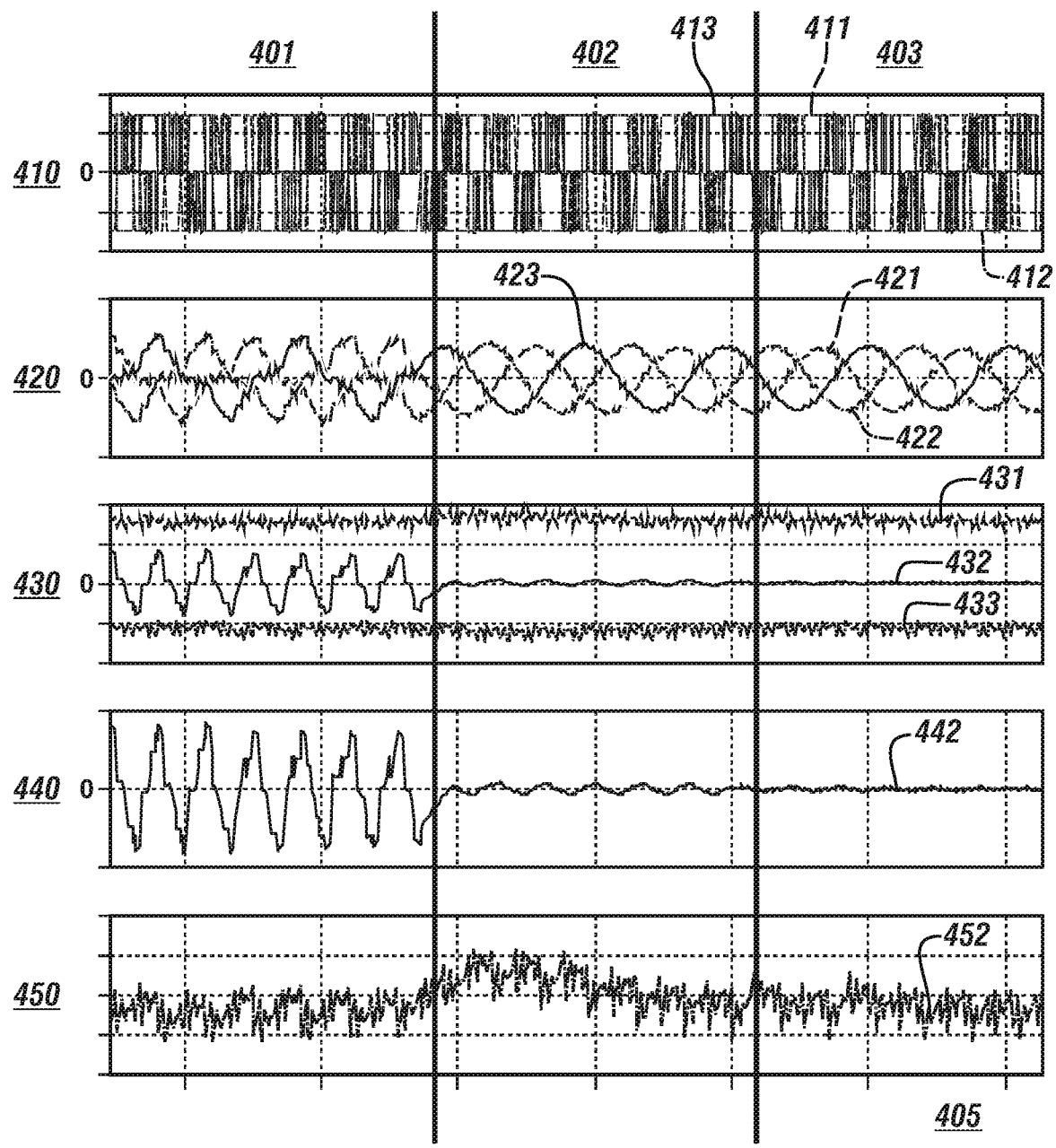
FIG. 4 graphically shows effects of implementing the concepts described herein with regard to FIG. 2 on an embodiment of the system described with regard to FIG. 1, particularly with regard to circulating current and output torque from the electric machine, in accordance with the disclosure.

FIG. 4 graphically shows effect of implementing the control system 100 described herein with regard to FIG. 2 to operate the cascaded inverter system 55 that is described with regard to FIG. 1, particularly with regard to circulating current and output torque from the electric machine 10. Time 405 is indicated on the horizontal axis, including a first time period 401, a second time period 402, and a third time period 403. During the first time period 401, parameters are shown for operation of the electric machine 10 without compensation. During the second time period 402, parameters are shown for operation of the electric machine 10 employing only dead-time compensation, as described hereinabove with regard to FIG. 2. During the third time period 403, parameters are shown for operation of the electric machine 10 employing dead-time compensation and voltage drop compensation, as described hereinabove with regard to FIG. 2. Plotted parameters include as follows: motor commands 410 in the form of PWM control signals for the first, second and third phases 411, 412, and 413, respectively; phase currents 420 including first, second and third phase currents 421, 422, and 423, respectively; synchronous reference frame currents 430 including q-axis current 431, d-axis current 433, and o-axis current 432, respectively. The o-axis current 432 represents the circulating current. The o-axis current 432 or circulating current is also shown with an expanded scale with reference to graph 440, including circulating current 442. The output torque 450 is also shown, including an output torque 452. The results indicate that implementing the control system 100 to operate the cascaded inverter system 55, particularly with regard to the circulating current 442 and the output torque 452 from the electric machine 10, provides an effective compensation for inverter non-linearities of dead-time period and inverter voltage drop without negatively affecting torque output from the electric machine 10. The circulating current 442 is reduced from an oscillating value to a near zero value. The output torque 452 from the electric machine 10 is minimally affected.

Figure 5:
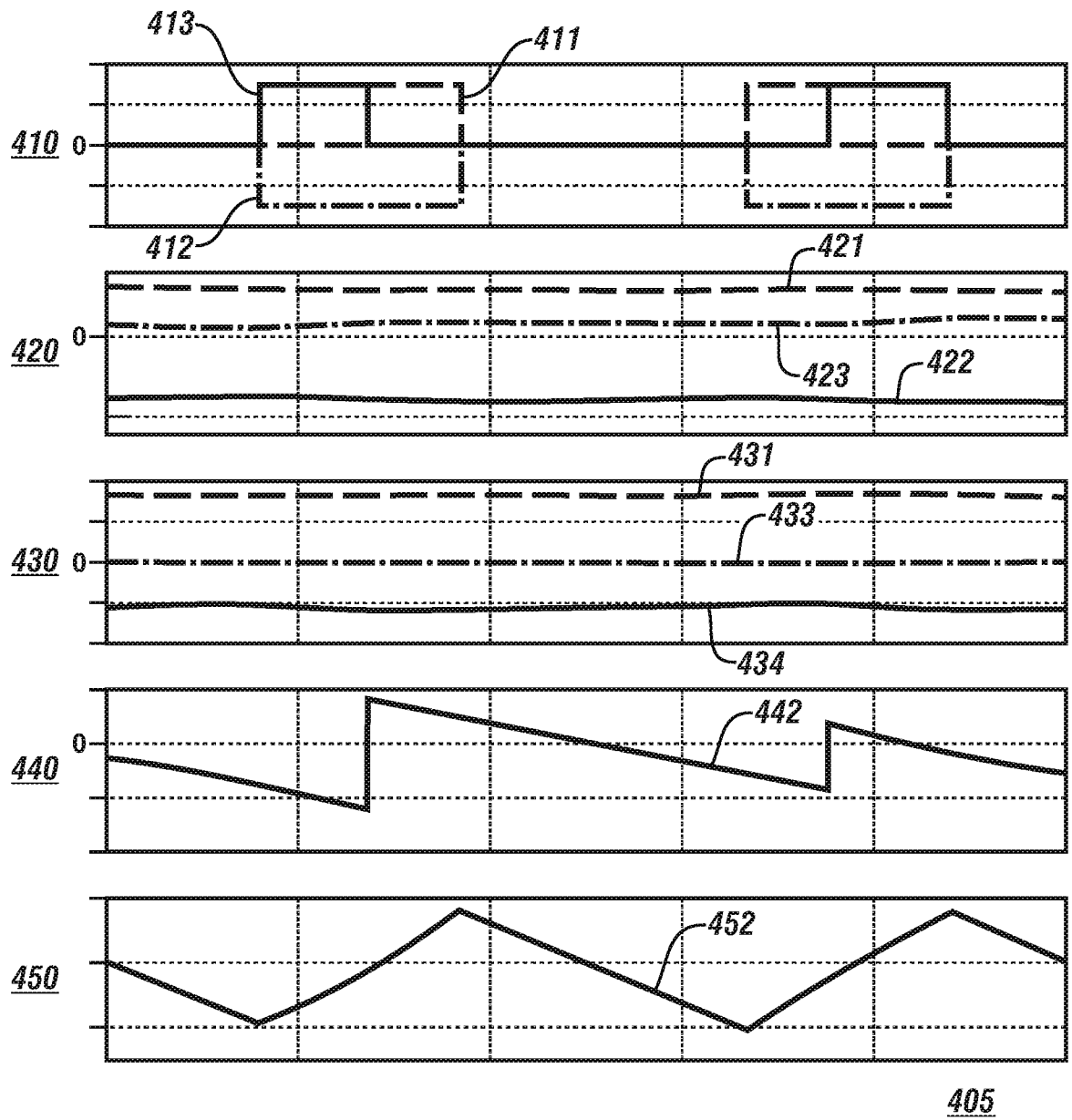
FIG. 5 graphically shows effects of implementing the concepts described herein with regard to FIG. 2 on an embodiment of the system described with regard to FIG. 1, including operation during a single electrical cycle, in accordance with the disclosure.

FIG. 5 graphically shows a portion of the results shown with reference to FIG. 4, demonstrating the effect of implementing the control system 100 described herein with regard to FIG. 2 to operate the cascaded inverter system 55 that is described with regard to FIG. 1, particularly with regard to circulating current and output torque from the electric machine 10. Particularly, operation during a portion of the third time period 403 is shown, with the time scale expanded to show a single electrical cycle. Time 405 is indicated on the horizontal axis. During the third time period 403, parameters are shown for operation of the electric machine 10 employing dead-time compensation and voltage drop compensation, as described hereinabove with regard to FIG. 2. Plotted parameters include as follows: motor commands 410 in the form of PWM control signals for the first, second and third phases 411, 412, and 413, respectively; phase currents 420 including first, second and third phase currents 421, 422, and 423, respectively; synchronous reference frame currents 430 including q-axis current 431, d-axis current 433, and o-axis current 432, respectively. The o-axis current 432 represents the circulating current. The o-axis current 432 or circulating current is shown with an expanded scale with reference to graph 440, including circulating current 442. The output torque 450 is also shown, including an output torque 452. The results indicate that implementing the control system 100 to operate the cascaded inverter system 55, particularly with regard to the circulating current 442 and the output torque 452 from the electric machine 10, provides an effective compensation for inverter non-linearities of dead-time period and inverter voltage drop without negatively affecting torque output from the electric machine 10. The circulating current 442 is reduced from an oscillating value to a near zero value. The output torque 452 from the electric machine 10 is minimally affected.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. A parameter is defined as a measurable quantity that represents a physical property of a device or other element that is discernible using one or more sensors and/or a physical model. A parameter can have a discrete value, e.g., either "1" or "0", or can be infinitely variable in value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A device for operating a multi-phase electric machine, comprising:
    a first multi-phase pulsewidth-modulated inverter circuit (first inverter) and a second multi-phase pulsewidth-modulated inverter circuit (second inverter), wherein the multi-phase electric machine is electrically connected in series therebetween; and
    a controller in communication with the first and second inverters, the controller including an instruction set, the instruction set executable to:
        determine an initial phase current,
        determine a first initial duty cycle for controlling the first inverter based upon the initial phase current,
        determine a switching frequency for the first inverter,
        determine a cycle period for the first inverter based upon the switching frequency,
        determine a first dead-time period associated with operation of the first inverter,
        determine a first dead-time compensation term based upon a comparison of the first dead-time period and the cycle period,
        determine a first voltage compensation term based upon a voltage drop across the first inverter,
        determine a final first duty cycle based upon the first initial duty cycle, the first dead-time compensation term and the first voltage compensation term,
        invert the initial phase current,
        determine a second initial duty cycle for controlling the second inverter based upon the inverted initial phase current,
        determine a second dead-time compensation term,
        determine a second voltage compensation term based upon a voltage drop across the second inverter,
        determine a final second duty cycle based upon the second initial duty cycle, the second dead-time compensation term and the second voltage compensation term, and
        control operation of the first inverter based upon the final first duty cycle and simultaneously control operation of the second inverter based upon the final second duty cycle.

2. The device of claim 1, wherein the first and second inverters are configured to operate in a linear modulation mode, and wherein the controller is disposed to control operation of the first inverter based upon the final first duty cycle and simultaneously control operation of the second inverter based upon the final second duty cycle when the controller is operating the first and second inverters in the linear modulation mode.

3. The device of claim 1, further comprising the controller in communication with the first inverter via a first gate driver and the controller in communication with the second inverter via a second gate driver.

4. The device of claim 1, wherein the multi-phase electric machine comprises a synchronous permanent magnet electric machine.

5. The device of claim 1, wherein the instruction set executable to determine the first voltage compensation term based upon the voltage drop across the first inverter comprises the instruction set executable to:
    determine an average voltage drop across the first inverter,
    determine a dc link voltage, and
    determine the first voltage compensation term based upon a ratio of the voltage drop across the first inverter and the dc link voltage.

6. The device of claim 1, wherein the instruction set executable to determine the second voltage compensation term based upon the voltage drop across the second inverter comprises the instruction set executable to:
    determine an average voltage drop across the second inverter,
    determine a dc link voltage, and
    determine the second voltage compensation term based upon a ratio of the voltage drop across the second inverter and the dc link voltage.

7. The device of claim 1, wherein the instruction set executable to determine the second dead-time compensation term comprises the instruction set executable to:
    determine a switching frequency for the second inverter,
    determine a cycle period for the second inverter based upon the switching frequency;
    determine a second dead-time period associated with operation of the second inverter, and determine the second dead-time compensation term based upon a comparison of the second dead-time period and the cycle period.

8. The device of claim 1, further comprising a current sensor disposed to monitor electric current between the first inverter and a phase winding of the multi-phase electric machine to determine the initial phase current.

9. A method for operating a multi-phase electric machine that is electrically connected in series between a first multi-phase pulsewidth-modulated inverter circuit (first inverter) and a second multi-phase pulsewidth-modulated inverter circuit (second inverter), the method comprising:
    determining an initial phase current;
    determining a first initial duty cycle for controlling the first inverter based upon the initial phase current;
    determining a first dead-time compensation term, including:
        determining a switching frequency for the first inverter,
        determining a cycle period for the first inverter based upon the switching frequency,
        determining a first dead-time period associated with operation of the first inverter, and
        determining the first dead-time compensation term based upon a comparison of the first dead-time period and the cycle period;
    determining a first voltage compensation term based upon a voltage drop across the first inverter;
    determining a final first duty cycle based upon the first initial duty cycle, the first dead-time compensation term and the first voltage compensation term;
    inverting the initial phase current;
    determining a second initial duty cycle for controlling the second inverter based upon the inverted initial phase current;
    determining a second dead-time compensation term;
    determining a second voltage compensation term based upon a voltage drop across the second inverter;
    determining a final second duty cycle based upon the second initial duty cycle, the second dead-time compensation term and the second voltage compensation term; and
    dynamically operating the first inverter based upon the final first duty cycle and simultaneously dynamically operating the second inverter based upon the final second duty cycle.

10. The method of claim 9, comprising operating the first inverter in a linear modulation mode based upon the final first duty cycle and simultaneously operating the second inverter in a linear modulation mode based upon the final second duty cycle.

11. The method of claim 9, wherein determining the first voltage compensation term based upon the voltage drop across the first inverter comprises:
    determining an average voltage drop across the first inverter;
    determining a dc link voltage; and
    determining the first voltage compensation term based upon a ratio of the voltage drop across the first inverter and the dc link voltage.

12. The method of claim 9, wherein determining the second voltage compensation term based upon the voltage drop across the second inverter comprises:
    determining an average voltage drop across the second inverter;
    determining a dc link voltage; and
    determining the second voltage compensation term based upon a ratio of the voltage drop across the second inverter and the dc link voltage.

13. The method of claim 9, wherein determining the second dead-time compensation term comprises:
    determining a switching frequency for the second inverter;
    determining a cycle period for the second inverter based upon the switching frequency;
    determining a second dead-time period associated with operation of the second inverter; and
    determining the second dead-time compensation term based upon a comparison of the second dead-time period and the cycle period.

14. The method of claim 9, wherein determining the initial phase current comprises monitoring the initial phase current via a current sensor disposed to monitor electric current between the first inverter and a phase winding of the multi-phase electric machine.

15. A method to minimize a circulating current during operation of a multi-phase electric machine that is electrically connected in series between a first multi-phase pulsewidth-modulated inverter circuit (first inverter) and a second multi-phase pulsewidth-modulated inverter circuit (second inverter), the method comprising:
    determining an initial phase current;
    determining a first initial duty cycle for controlling the first inverter based upon the initial phase current;
    determining a first dead-time compensation term, including:
        determining a switching frequency for the first inverter,
        determining a cycle period for the first inverter based upon the switching frequency,
        determining a first dead-time period associated with operation of the first inverter, and
        determining the first dead-time compensation term based upon a comparison of the first dead-time period and the cycle period;
    determining a first voltage compensation term based upon a voltage drop across the first inverter;
    determining a final first duty cycle based upon the first initial duty cycle; the first dead-time compensation term and the first voltage compensation term;
    determining a second initial duty cycle for controlling the second inverter;
    inverting the initial phase current;
    determining a second dead-time compensation term based upon the inverted initial phase current;
    determining a second voltage compensation term based upon a voltage drop across the second inverter;
    determining a final second duty cycle based upon the second initial duty cycle;
    the second dead-time compensation term and the second voltage compensation term; and
    dynamically controlling, via a controller, operation of the first inverter based upon the final first duty cycle and simultaneously dynamically controlling operation of the second inverter based upon the final second duty cycle to minimize the circulating current.

* * * * *